(12) United States Patent
Li et al.

(10) Patent No.: US 6,809,131 B2
(45) Date of Patent: Oct. 26, 2004

(54) SELF-COMPACTING ENGINEERED CEMENTITIOUS COMPOSITE

(75) Inventors: Victor C. Li, Ann Arbor, MI (US); Hyun-Joon Kong, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 319 days.

(21) Appl. No.: 09/902,064

(22) Filed: Jul. 10, 2001

(65) Prior Publication Data

US 2002/0019465 A1 Feb. 14, 2002

Related U.S. Application Data

(60) Provisional application No. 60/217,309, filed on Jul. 10, 2000.

(51) Int. Cl.[7] ............................................. C04B 16/06
(52) U.S. Cl. ............................................................. 524/5
(58) Field of Search ............................................... 524/5

(56) References Cited

U.S. PATENT DOCUMENTS

| | | |
|---|---|---|
| 3,638,377 A | 2/1972 | Caspe |
| 3,785,741 A | 1/1974 | Lodige |
| 3,903,587 A | 9/1975 | Boiardi |
| 4,023,324 A | 5/1977 | Majeske |
| 4,407,676 A | 10/1983 | Restrepo |
| 4,548,009 A | 10/1985 | Dahowski |
| 4,587,773 A | 5/1986 | Valencia |
| 4,636,345 A * | 1/1987 | Jensen et al. ............ 264/122 |
| 4,644,714 A | 2/1987 | Zayas |
| 4,799,339 A | 1/1989 | Kobori et al. |
| 4,815,886 A | 3/1989 | Madsen |
| 4,881,350 A | 11/1989 | Wu |
| 4,883,250 A | 11/1989 | Yano et al. |
| 4,922,667 A | 5/1990 | Kobori et al. |
| 5,043,033 A | 8/1991 | Fyfe |
| 5,502,932 A | 4/1996 | Lu |
| 5,660,007 A | 8/1997 | Hu et al. |
| 5,675,943 A | 10/1997 | Southworth |
| 5,797,231 A | 8/1998 | Kramer |
| 5,983,582 A | 11/1999 | Vugrek |
| 5,988,648 A | 11/1999 | Schmid |
| 6,012,256 A | 1/2000 | Aschheim |
| 6,039,503 A | 3/2000 | Cathey |
| 6,052,964 A | 4/2000 | Ferm et al. |
| 6,060,163 A | 5/2000 | Naaman |
| 6,106,945 A * | 8/2000 | Mayahara et al. .......... 428/397 |
| 6,151,790 A | 11/2000 | Whitfield |
| 6,189,278 B1 | 2/2001 | Stegmeier |
| 6,189,286 B1 | 2/2001 | Seible et al. |
| 6,194,051 B1 | 2/2001 | Gagas et al. |
| 6,237,303 B1 | 5/2001 | Allen et al. |
| 6,276,106 B1 | 8/2001 | Shotton et al. |
| 6,389,774 B1 | 5/2002 | Carpenter |
| 6,401,416 B1 | 6/2002 | Ytterberg |
| 6,434,904 B1 | 8/2002 | Gutschmidt et al. |

FOREIGN PATENT DOCUMENTS

| | | |
|---|---|---|
| CH | 630 131 | 5/1982 |
| DE | 1 279 918 | 10/1968 |
| EP | 0 448 577 B1 | 11/1993 |
| EP | 0 699 808 A1 | 6/1996 |
| JP | 54-31421 | * 3/1979 |
| JP | 56-125269 | * 10/1981 |
| JP | 59-8664 | * 1/1984 |

OTHER PUBLICATIONS

H. Fukuyama, Y. Masuda, Y. Sonobe, and M. Tanigaki, "Structural Performances of Concrete Frame Reinforced with FRP Reinforcement," Non–Metallic (FRP) Reinforcement For Concrete Structures, 1995, E & FN Spon, England.

Z. Lin, T. Kanda and V. C. Li, "On Interface Property Characterization and Performance on Fiber–Reinforced Cementitious Composites," Concrete Science and Engineering, Sep. 1999, pp. 173–184, vol. 1, Rilem Publications S.A.R.L.

V. C. Li, "Metal–Like Concrete for Constructed Facilities," Powerpoint presentation presented in Ann Arbor, Michigan, in May, 2000.

V. C. Li and C. Leung, "Steady–State and Multiple Cracking of Short Random Fiber Composites," Journal of Engineering Mechanics, Nov. 1992, pp. 2246–2264, vol. 118, No. 11, ASCE.

* cited by examiner

Primary Examiner—Peter Szekely
(74) Attorney, Agent, or Firm—Brooks Kushman P.C.

(57) ABSTRACT

Short fiber-reinforced engineering cementitious composites which are self-compacting, can be prepared by adding hydrophilic polymer fibers to a cement composition containing polymeric thickener and superplasticizer. The compositions are exceptionally ductile and exhibit many of the physical characteristics previously available only with hydrophobic high performance polyethylene fibers.

26 Claims, 1 Drawing Sheet

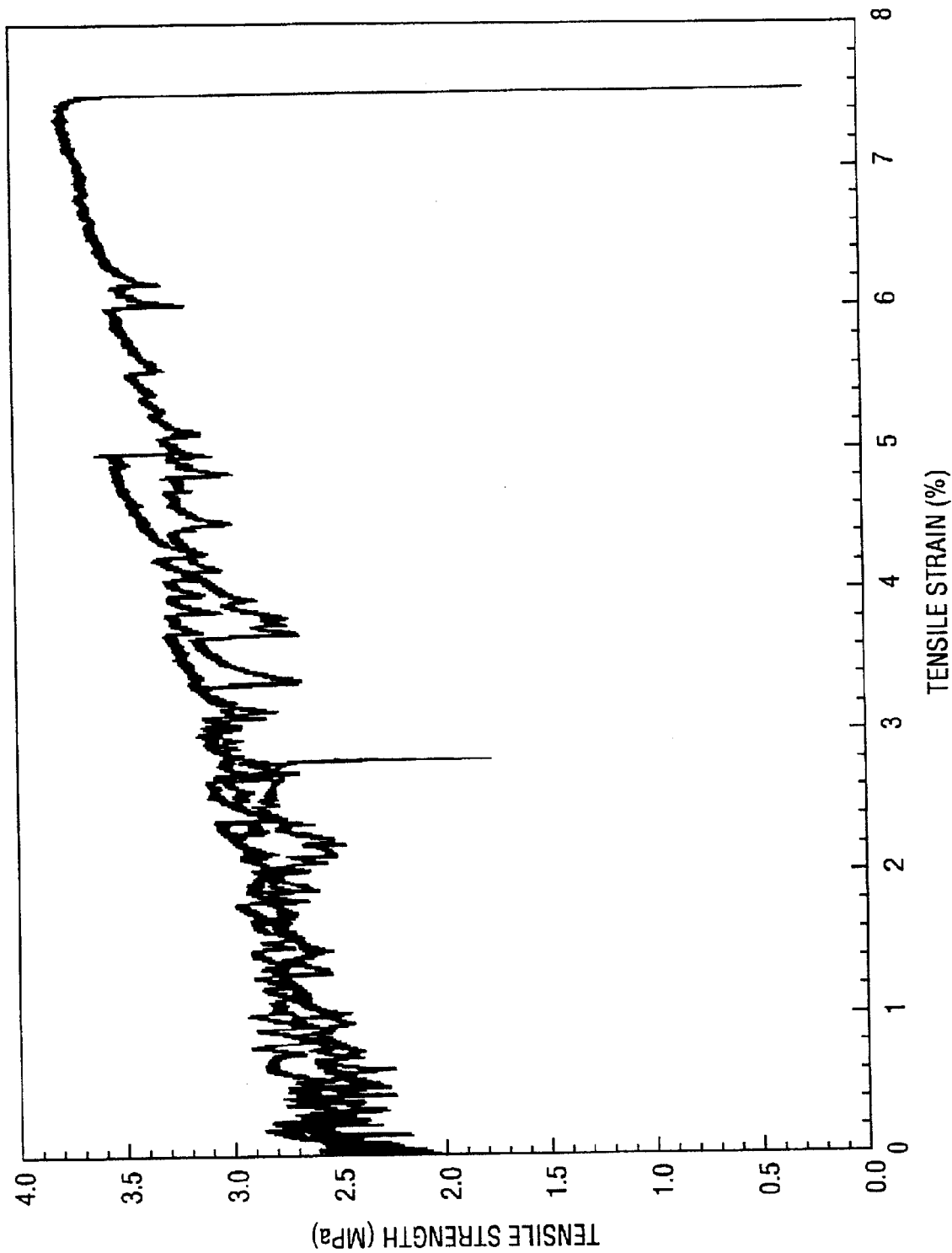

SELF-COMPACTING ENGINEERED CEMENTITIOUS COMPOSITE

CROSS-REFERENCE TO RELATED APPLICATIONS

This application claims the benefit of U.S. provisional application Ser. No. 60/217,309, filed Jul. 10, 2000.

BACKGROUND OF THE INVENTION

1. Field of the Invention

The present invention relates to a self-compacting engineered cementitious composite and method for making the same, and more preferably a self-compacting hydrophilic fiber/engineered cementitious composite and method for making the same.

2. Background Art

Many buildings and other load bearing structures are constructed with cementitious materials, such as concrete and cement. However, conventional concrete or cement materials tend to be brittle and, as such, tend to be relatively susceptible to failing in a catastrophic manner when subjected to tensile loading. To overcome this shortcoming, engineered cementitious composites (ECC) have been developed. ECCs are high ductility and high toughness cementitious composites and comprise a modified cement containing small amounts of short reinforcing fibers. The superior ductility and high toughness of ECC materials allows the ECC materials to be used in demanding structures where severe loading or high deformation is imposed, such as in construction facilities subjected to seismic loads. ECCs have also been used or are currently being investigated for use as materials for building and/or civil engineering structures, such as walls, floors, flat slabs, support beams and columns, as well as for manufactured elements, such as extruded pressure pipes and tubing.

Due to the poor fluidity of fresh concrete, the placing and casting of concrete in the field generally requires a considerable amount of vibration and consolidation. Moreover, there are cases, such as when using formworks with complicated and congested reinforcement or those with unusual geometries, that normal vibration and consolidation are difficult or even impossible to be conducted. If concrete is not properly compacted, gaps, voids, and/or cracks can be formed in the resulting concrete structure thereby significantly affecting the performance (the constructionability and reliability) of the concrete structure.

Even in situations where the concrete can be properly compacted with the use of vibration and other external compaction methods, the noise, construction time, and cost generated from these techniques is considerable and undesirable. As can be readily understood, the inclusion of any fibrous materials into concrete makes the concrete material more difficult to compact, thereby typically requiring additional vibration over that necessary for concrete compositions that are essentially similar except for the inclusion of fibrous material. ECC containing hydrophobic, high performance polyethylene fibers have been prepared previously. However, such PE fibers are very expensive.

Accordingly, it would be desirable to provide a concrete material that has higher ductility and toughness than ordinary concrete while at the same time is able to flow under its own weight and fill in the framework in cast processing without a need for significant, if any, external vibration, i.e., is self-compacting, and which can use less expensive fibers in its preparation.

SUMMARY OF THE INVENTION

The present invention pertains to self-compacting engineered cementitious compositions containing a small volume proportion of non-hydrophobic fibers.

BRIEF DESCRIPTION OF THE DRAWINGS

The FIGURE is a chart showing the tensile stress-strain curve for the specimens in the Example.

DETAILED DESCRIPTION OF THE PREFERRED EMBODIMENTS

The present invention comprises self-compacting engineered cementitious (ECC) composites and a method for making the same. "Self-compactability" of a material refers to the capability that the materials can flow under its own weight and fill in the formwork in cast processing without any, or a substantial amount of, external vibration. "Self-compacting ECC" refers to ECC that possesses self-compactability. Despite the presence of fibers in the compositions, the self-compacting ECC is able to overcome the obstacle of rebars and fill in each corner of the formwork easily with no or little external vibration.

The ECC composites of the present invention are particularly well suited for use in structures where severe loading or high deformation is imposed. Suitable examples of uses for the ECC composites of the present invention include, but are not limited to, building structures such as columns and beams, slab constructions such as roadways, driveways and patios, and manufactured elements such as extruded pressure pipes and tubes.

The ECC composites are formed from a fiber-reinforced cementitious composition comprising a mixture of cementitious material and hydrophilic fibers. The term "cementitious" includes conventional concretes and mixtures thereof, and other building compositions which rely on hydraulic curing mechanisms. Suitable examples of such compositions include, but are not necessarily limited to, various types of cements, such as lime cement, Portland cement, refractory cement, slag cement, expanding cement, pozzolanic cement, mixtures of cements, etc.

Preferably, the cementitious material comprises cement, sand, stabilizing admixtures, derivatized celluloses, i.e., methyl cellulose, hydroxy methyl cellulose, hydroxy ethyl cellulose, hydroxypropyl cellulose, and carboxymethyl cellulose, superplasticizer and water. It should be understood that when referring to these and other components in the singular, unless expressly indicated to the contrary, these components are present in an amount of at least one, and sometimes preferably more than one of the particular components. It should be further understood by one skilled in the art that other typical cementitious material components may also be present. Additional components, such as setting retarders or enhancers, consistency aids, etc., may be added as well.

More preferably, the fiber reinforced cementitious composition may comprise cementitious material having a water-cement ratio of about 25 wt % (0.25) to about 60 wt % (0.60), a sand-cement ratio of about 20 wt % (0.20) to about 160 wt % (1.60), a thickener-cement ratio of about 0.001 wt % (0.00001) to about 0.5 wt % (0.05), and a superplasticizer-cement ratio of about 0.1 wt % (0.001) to about 5 wt % (0.05).

Even more preferably, the fiber reinforced cementitious composition may comprise cementitious material having a water-cement ratio of about 30 wt % (0.30) to about 50 wt % (0.50), a sand-cement ratio of about 30 wt % (0.30) to about 120 wt % (1.20), a thickener-cement ratio of about 0.01 wt % (0.0001) to about 0.2 wt % (0.002), and a superplasticizer-cement ratio of about 0.5 wt % (0.005) to about 1.5 wt % (0.015).

The thickener, or viscosifying agent, may be any of those commercially available, including a wide variety of protective colloid-stabilized redispersible powders. Preferably, the thickening agent is a derivatized cellulose thickener.

Examples of suitable derivatized cellulose compounds include, but are not necessarily limited to, methyl cellulose, hydroxyethyl cellulose, hydroxypropyl cellulose, carboxymethyl cellulose, etc. Preferably, the derivatized cellulose compounds are provided in the cementitious material in the form of an aqueous solution, preferably in a thickener-cement (weight) ratio of about 0.005 to 0.05, and most preferably, about 0.01.

Examples of suitable superplasticizers are well known to those skilled in the art. These include, but are not necessarily limited to, sulfonated condensates of melamine and formaldehyde, and polycarboxylates such as polyacrylic acid, polymaleic acid, and copolymers of carboxylic acid-containing monomers and other unsaturated monomers, for example copolymers of acrylic acid, maleic acid, and ethylene. Preferably, the superplasticizers include melamine formaldehyde sulfonate or polycarboxylate copolymers. Preferably, the superplasticizer is provided in the cementitious material in an aqueous solution, preferably, in a concentration of about 20–50 wt %, most preferably about 33.3 wt %. The polymeric thickener and the superplasticizer may also be provided as a single chemical serving both the functions of a polymeric thickener and superplasticizer.

In addition to other optional cementitious material components, fly ash may be present in the cementitious material in an amount of up to about 50%, by weight.

The hydrophilic fibers may be one or more of any suitable discontinuous, polymeric hydrophilic fibers, and are preferably provided in bundled form. Examples of suitable hydrophilic fibers include, but are not necessarily limited to PVA (polyvinyl alcohol) fibers, EVOH (ethylene-vinyl-alcohol) fibers, and the like. Hydrophilic acrylic and acrylamide fibers may also be used.

It was unexpected that hydrophilic fibers would be successful in use in self-compacting ECC. Hydrophobic fibers have little attraction for the aqueous components of cement, which are themselves hydrophilic or ionic. Due to this low level of interaction, the viscosity of ECC containing hydrophobic fibers would simply depend on the fiber loading for a given matrix composition. In addition, the fresh ECC is solidified without any segregation at the interface between the matrix and the fibers. However, hydrophilic fibers generate strong interactions with the water and other ingredients of the concrete mix. Thus, the presence of even small amounts of hydrophilic fibers would be expected to impede cohesion between the matrix and fibers, and result in severe segregation. Surprisingly, however, it has been found that by using hydrophilic fibers, a self-compacting ECC can be obtained.

The amounts of fibers which can be added will vary with the basic concrete mix as well as the nature and size of the fibers. In general, quite low amounts, generally below 3%, by volume, are used, most preferably 1–2.5%. The amount must be such to provide the necessary ductility (tensile strain capacity of about 1–10%, and more preferably of about 3–7%) to the composition at the low end of concentration, and a sufficiently low amount on the high end to allow self-compaction. In general, with conventional fiber sizes, compaction will be difficult without vibration if the fiber content exceeds 2–3%. The hydrophilic fibers are preferably present in the ECC in an amount of about 0.5 to about 10 volume %, more preferably in an amount of about 1 to about 3 volume %, and most preferably in an amount of about 1 to about 2 volume %.

The hydrophilic fibers preferably have a tenacity of about 1000–2500 MPa, more preferably of about 1250–2000 MPa, and most preferably of about 1500–1750 MPa.

The hydrophilic fibers preferably have a percent elongation of about 3–20%, more preferably of about 4–10%, and most preferably of about 5–7.5%.

The hydrophilic fibers preferably have a modulus (E) of about 30–60 GPa, more preferably of about 35–50 GPa, and most preferably of about 40–45 GPa.

The hydrophilic fibers preferably have a diameter of about 10–60 $\mu$m, more preferably of about 25–50 $\mu$m, and most preferably of about 35–45 $\mu$m, and a length of about 5–30 mm, more preferably of about 6–25 mm, and most preferably of about 6–18 mm.

In a preferred embodiment, the hydrophilic fibers comprise PVA (polyvinyl alcohol) fibers that have been coated with a 0.05–1.5 wt %, more preferably a 0.1–1.2 wt %, and most preferably a 0.3–1.0 wt % of an oiling agent, such as poly(oxymethylene). The fibers may be coated with the oiling agent by any conventional manner, such as by dip-coating or spraying the hydrophilic fibers. Other oiling agents may be used as well.

It should be understood that a minor amount of hydrophobic fibers, such as polyethylene (i.e., Spectra™ fibers) may also be included in the ECC. If present, the hydrophobic fibers should not be present in an amount greater than 5 volume %, more preferably 3 volume %, and most preferably 1 volume %. It is preferable that the compositions substantially exclude hydrophobic fibers.

The fiber-reinforced cementitious compositions of the present invention may be prepared in any suitable manner. However, a preferred process for preparing the fiber-reinforced cementitious composition comprising the steps of 1) mixing dry powders including cement, sand, fly ash, and defoamer; 2) mixing of the above with water for several minutes; 3) adding hydroxypropylmethyl cellulose aqueous solution (1 volume %) into the fresh mix and mixing for about 10 minutes; 4) adding superplasticizer aqueous solution (33.3 wt %) to disperse the particles and mixed for about 2 minutes; and 5) adding hydrophilic fibers, such as PVA fibers into the fresh cementitious mix and mixing until somewhat homogenous.

In a preferred embodiment, the fiber can be dispersed into the cementitious matrix at low water-cement ratio to obtain more uniformity in fiber dispersion. Then, the residual amount of water is added. In another preferred embodiment, the reinforcing hydrophilic fibers are presoaked in water before being dispersed into the fresh cementitious mix. Prior to mixing, the PVA fiber can be in random form or in bundled form (with a water-soluble binder), with the bundled form being preferred.

EXAMPLE

A specific example of a composition of a self-compacting PVA-ECC, expressed at a weight ratio, unless otherwise indicated, is as follows:

| Cement[1] | Sand[2] | Fly ash[3] | Water | HPMC[4] | SP[5] | Fiber (Vol %) |
|---|---|---|---|---|---|---|
| 1.00 | 0.60 | 0.15 | 0.45 | 0.0015 | 0.01 | 2.00 |

[1]Ordinary Portland type I cement (average particle diameter = 11.7 ± 6.8 mm, LaFarge Co.).
[2]Silica sand (average particle diameter = 110 ± 6.8 mm, U.S. Silica Co.).
[3]Fly ash (average particle diameter = 2.4 ± 1.6 mm, Boral Material Technologies Inc.).
[4]Hydroxypropylmethylcellulose (HPMC, DOW Chemical Co.).
[5]Melamine formaldehyde sulfonate (MFS. W.R. Grace Chemical Co.).
The HPMC and SP were mixed together before being added to the mixture.

A PVA fiber with the following properties was used:

| Type | Tenacity (MPa) | Elongation (%) | Modulus (GPa) | Diameter (μm) | Length (mm) |
|---|---|---|---|---|---|
| Fiber B' | 1620 | 6.0 | 42.8 | 39 | 12 |

The fiber surface has been coated with 0.3 wt % of an oiling agent (poly(oxymethylene)).

To demonstrate the ductility of the self-compacting ECC, tensile tests were performed on specimens made with the PVA-ECC composition described above without any vibration. The specimens were cured for four weeks. The FIGURE shows the measured tensile stress-strain curve. First crack strengths of 2.1–2.6 MPa and ultimate tensile strengths of 2.8–3.8 MPa were obtained. Tensile strain capacities of 3–7.5% were achieved. In comparison, typical concrete and self-compacting concrete possess tensile strain capacity of less than 0.1%.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-compacting, fiber-reinforced engineered cementitious composite comprising:
   cementitious material comprising:
   cement and sand;
   at least one polymeric thickener;
   at least one superplasticizer; and
   water; and
   from 0.5 to 10 volume % of hydrophilic reinforcing fibers having a modulus (E) of about 35–50 GPa and a percent elongation of about 3–20%; wherein the hydrophilic fibers are coated with an oiling agent comprising poly(oxymethylene).

2. The composite of claim 1 wherein the hydrophilic fibers comprise polyvinyl alcohol fibers.

3. The composite of claim 1 further comprising hydrophobic fibers.

4. The composite of claim 1 wherein the hydrophilic fibers have a tenacity of about 1000–2500 MPa.

5. The composite of claim 1 wherein the hydrophilic fibers have a modulus (E) of about 40–45 GPa.

6. The composite of claim 5 wherein the hydrophilic fibers have a diameter of about 10–60 μm.

7. The composite of claim 6 wherein the hydrophilic fibers have a length of about 5–30 mm.

8. A method of making a composite structural material (engineered cementitious composite), said method comprising:
   mixing from 0.5 to 10 volume % of hydrophilic reinforcing fibers having a modulus (E) of about 35–50 GPa and a percent elongation of about 3–20% with cementitious material comprising cement and sand, at least one polymeric thickener, at least one superplasticizer, and water, wherein the hydrophilic fibers are coated with an oiling agent comprising poly(oxymethylene).

9. The method of claim 8 wherein the hydrophilic fibers comprise polyvinyl alcohol fibers.

10. The method of claim 8 further comprising hydrophobic fibers.

11. The method of claim 8 wherein the hydrophilic fibers have a tenacity of about 1000–2500 MPa.

12. The method of claim 11 wherein the hydrophilic fibers have a modulus (E) of about 40–45 GPa.

13. The method of claim 12 wherein the hydrophilic fibers have a diameter of about 10–60 μm.

14. The method of claim 13 wherein the hydrophilic fibers have a length of about 5–30 mm.

15. The method of claim 8 wherein the composite structural material is made without the use of any external vibration.

16. The method of claim 14 wherein the composite structural material is made without the use of any external vibration.

17. A method of making a composite structural material (engineered cementitious composite), said method comprising:
   1) mixing powders of dry cement, sand, fly ash and defoamer;
   2) mixing the dry powder mixture of 1) with water;
   3) mixing an aqueous solution of cellulose compound with the mixture of 2);
   4) mixing an aqueous solution of superplasticizer with the mixture of 3); and
   5) mixing hydrophilic fibers having a modulus (E) of about 35–50 GPa and a percent elongation of about 3–20% with the mixture of 4), wherein the hydrophilic fibers are coated with an oiling agent comprising poly(oxymethylene).

18. The method of claim 17 wherein the components and the mixture of 2) are mixed for about 2 minutes, wherein the components of mixture 3) are mixed for about 5 to 10 minutes, and wherein the components of mixture 4) are mixed for about 2 minutes.

19. The method of claim 18 wherein additional water is mixed with the mixture of 5).

20. The method of claim 17 wherein the reinforcing hydrophilic fibers are pre-soaked in water before being mixed with the mixture of 4).

21. The method of claim 17 wherein the hydrophilic fibers are in random, discontinuous form.

22. The method of claim 17 wherein the hydrophilic fibers are provided in a bundle form.

23. The composite of claim 1 wherein the components are present in sufficient amounts such that when the composite is cured the resulting cured product has a first crack strength of 2.1–2.6 MPa and an ultimate tensile strength of 2.8–3.8 MPa.

24. The composite of claim 23 wherein the components are present in sufficient amounts such that when the composite is cured the resulting cured product has a tensile strain capacity of 3–7.5%.

25. The composite of claim 1 wherein the components are provided in such amounts that the composite has a water-cement ratio of about 25 wt % to about 60 wt %, a sand-cement ratio of about 20 wt % to about 160 wt %, a thickener-cement ratio of about 0.001 wt % to about 0.5 wt %, and a superplasticizer-cement ratio of about 0.1 wt % to about 5 wt %.

26. The composite of claim 1 wherein the fibers have been coated with 0.5–1.5 weight percent of the oiling agent.

* * * * *